(12) United States Patent  
Slayton et al.

(10) Patent No.: US 6,301,468 B1  
(45) Date of Patent: Oct. 9, 2001

(54) ELECTRICAL CONNECTOR FOR A REMOVABLE FLIP

(75) Inventors: Michael J. Slayton, Raleigh; Stacy N. Smith, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/057,054

(22) Filed: Apr. 8, 1998

(51) Int. Cl.[7] .................................................. H04B 1/38
(52) U.S. Cl. .............................. 455/90; 455/550; 455/575
(58) Field of Search ......................... 455/90, 550, 575, 455/347, 351; 439/8, 469

(56) References Cited

U.S. PATENT DOCUMENTS

| | | |
|---|---|---|
| 4,471,493 | 9/1984 | Schober . |
| 4,708,663 * | 11/1987 | Eckart ................................. 439/469 |
| 4,939,792 | 7/1990 | Urbish et al. . |
| 5,014,346 | 5/1991 | Phillips et al. . |
| 5,018,980 * | 5/1991 | Robb ........................................ 439/8 |
| 5,073,761 | 12/1991 | Waterman et al. . |
| 5,170,173 | 12/1992 | Krenz et al. . |
| 5,319,582 * | 6/1994 | Ma ................................... 364/708.1 |
| 5,337,061 | 8/1994 | Pye et al. . |
| 5,508,709 | 4/1996 | Krenz et al. . |
| 5,554,996 | 9/1996 | Chatzipetros . |
| 5,561,437 | 10/1996 | Phillips et al. . |
| 5,572,223 | 11/1996 | Phillips et al. . |
| 5,606,730 * | 2/1997 | Rush et al. ............................. 455/90 |
| 5,732,331 * | 3/1998 | Harms .................................... 455/90 |
| 5,772,459 * | 6/1998 | Swart ................................... 439/341 |
| 5,995,373 * | 11/1999 | Nagai ................................... 361/755 |

FOREIGN PATENT DOCUMENTS

| | | | |
|---|---|---|---|
| 2788892A1 * | 1/1999 | (FR) | .............................. H01R/35/04 |
| 11354242A * | 6/1998 | (JP) | .............................. H01R/35/04 |
| WO 96/21988 | 7/1996 | (WO) . | |
| WO 97/34376 * | 9/1997 | (WO) | .............................. H04B/1/38 |

* cited by examiner

Primary Examiner—Daniel Hunter  
Assistant Examiner—C. Chow  
(74) Attorney, Agent, or Firm—Wood, Phillips, VanSanten, Clark & Mortimer

(57) ABSTRACT

A radio communication device including a housing and a flip that is rotatably connected to the housing by a hinge means. The housing contains electrical components on a printed circuit board. The flip contains electrical devices including an antenna and a microphone. A coupling is contained in the hinge means between the housing and the flip which electrically and mechanically couples the housing to the flip. The electrical components in the flip are connected to the printed circuit board through the coupling. The coupling includes a receptacle that is fixed relative to the housing and a header electrically and mechanically coupled to the receptacle. A bearing circumscribes the header and is able to rotate freely around the header. The bearing is held in place around the header by a bearing retainer. The bearing is fixedly attached to the flip and allows the flip to rotate around the coupling while the coupling remains fixed relative to the housing, allowing the coupling to act as an axle mechanism.

38 Claims, 5 Drawing Sheets

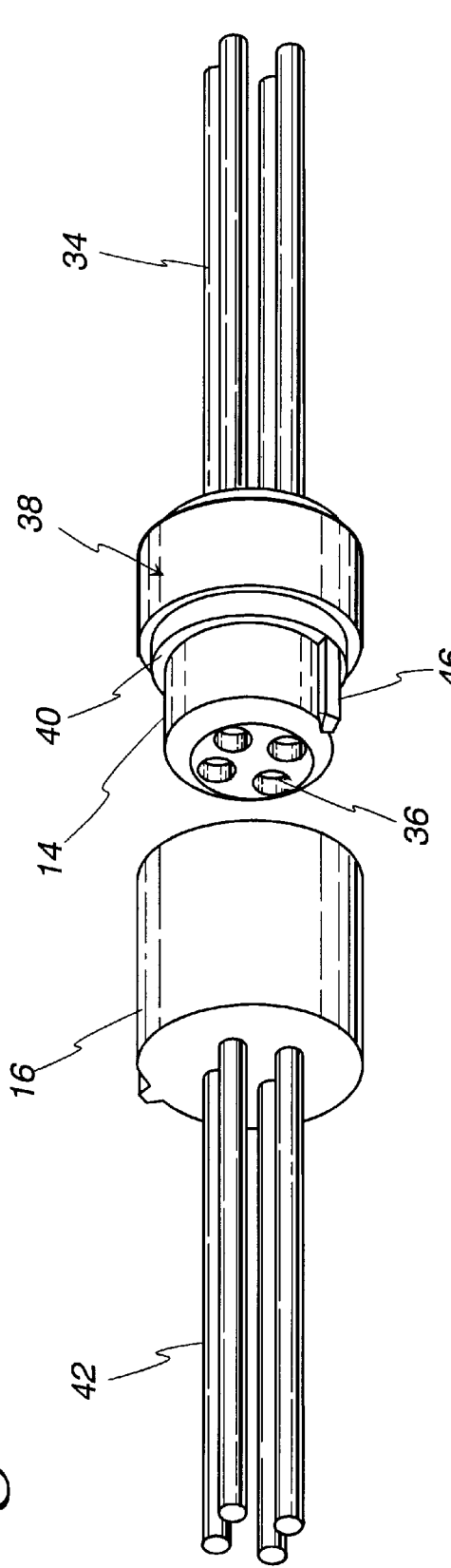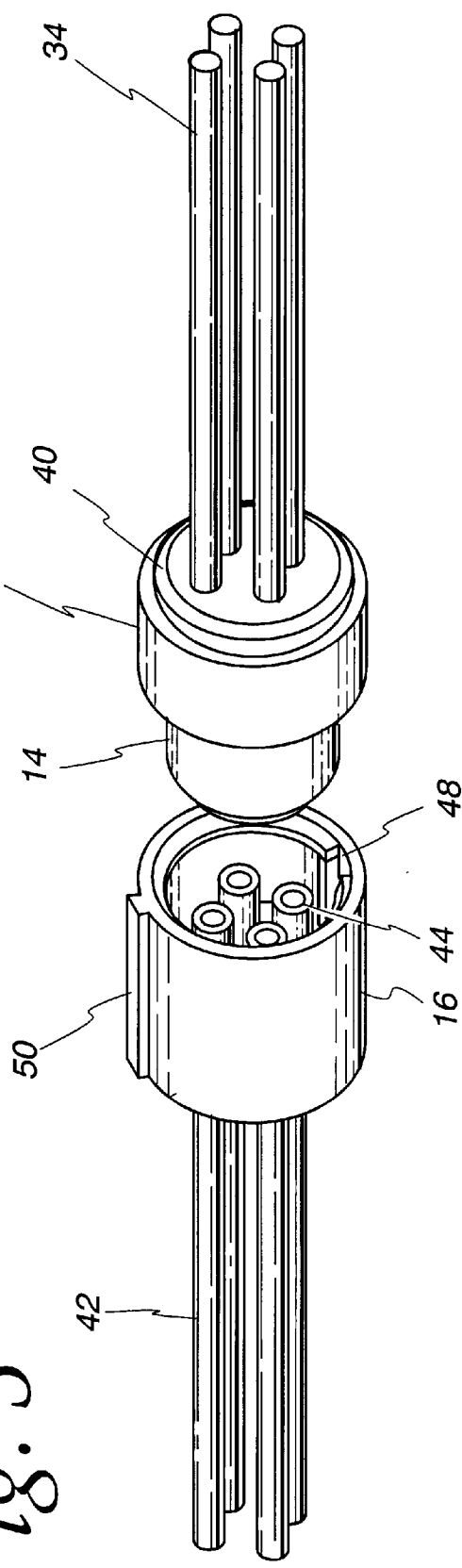

ELECTRICAL CONNECTOR FOR A REMOVABLE FLIP

BACKGROUND OF THE INVENTION

1. Field of the Invention

This invention relates generally to the field of communications and particularly to electrical connection between the flip and the housing of radio communication devices.

2. The Prior Art

It is well known to incorporate electrical components, such as antennas, into a flip that is rotatably attached to the housing of radio communication devices. When electrical components are incorporated into the flip, it is necessary to electrically couple them to the electrical elements in the housing of the radio communication device. However, a difficulty exists whenever electrical signals must be transferred between elements that rotate with respect to one another.

Previous methods of electrically coupling the electrical elements in the flip to the electrical elements in the housing of the radio communication device include individual wires, flexible circuitry, and coaxial rotating connectors with integral sliding contacts. Individual wires or flexible circuitry limit rotation, cause wear and noise after repeated flexing, and do not allow for easy assembly or removal of the flip for servicing as a separate entity. The use of individual wires or flexible circuitry may also require de-soldering of the wires or flexible circuitry from the electrical components in the housing of the radio communication device to completely remove the flip from the housing. Coaxial rotating connectors produce signal noise when rotating and do not meet the requirements for microphone signal transmission.

SUMMARY OF THE INVENTION

The present invention encompasses a radio communication device which comprises a housing and a flip rotatably attached to the housing. The housing contains electrical components on a printed circuit board. The flip contains electrical components including an antenna and a microphone. The flip has two flip ears that rotatably attach the flip to the housing, thus creating a flip axis of rotation. An axle mechanism is contained partially in one flip ear and partially in the housing to mechanically couple the flip to the housing. A coupling is contained partially in the other flip ear and partially in the housing to mechanically and electrically couple the flip to the housing. The coupling allows electrical signals to pass from the electrical components in the flip to the printed circuit board in the housing while the coupling functions as the other axle mechanism.

The coupling comprises a receptacle that is press fit into the housing and a header circumscribed by a bearing that is press fit as an assembly into one of the flip ears. The header and the bearing are held in position with respect to one another by a bearing retainer. The receptacle remains fixed with respect to the flip axis and the housing. The header is mechanically and electrically coupled to the receptacle and remains fixed with respect to the receptacle. When mated, the bearing allows the flip to rotate around the header, thereby allowing the flip to rotate with respect to the housing. Furthermore, the coupling of the present invention allows the flip to be completely removed from the housing and serviced as a separate entity.

In an alternate embodiment, a radio communication device comprises a housing and a flip rotatably attached to the housing. The flip has a single flip ear that rotatably attaches the flip to the housing, thus creating a flip axis of rotation. An axle mechanism is contained partially in one side of the flip ear and partially in the housing to mechanically couple the flip to the housing. A connector comprising a header and a receptacle as described above is contained partially in the other side of the flip ear and partially in the housing to mechanically and electrically couple the flip to the housing.

These and other features and advantages of the invention will be apparent upon consideration of the following detailed description of the preferred embodiments of the invention, taken in conjunction with the appended drawings.

BRIEF DESCRIPTION OF THE DRAWINGS

FIG. 2 is a perspective view of a preferred embodiment of a coupling in accordance with the invention.

FIG. 3 is a perspective view of a preferred embodiment of a coupling in accordance with the invention.

DETAILED DESCRIPTION OF THE PRESENTLY PREFERRED EMBODIMENTS

Figure 1:
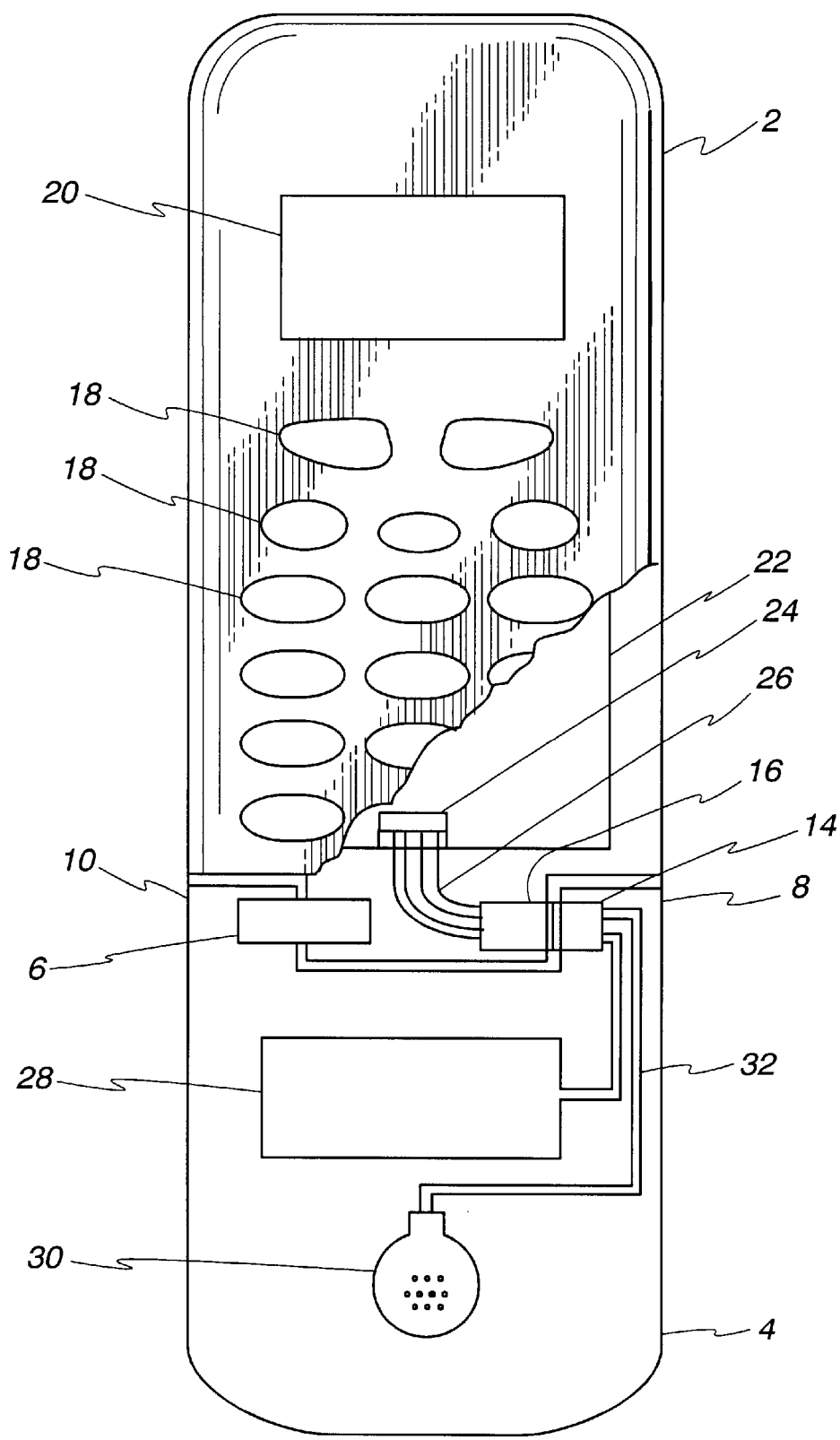
FIG. 1 is a front perspective view of a preferred embodiment of a radio communication device in accordance with the invention including a cut-away portion to show internal features.

Referring to FIG. 1, a housing 2 of a radio communication device has a means to rotatably connect a flip 4 to the housing 2. In a preferred embodiment, the means to rotatably connect the housing 2 to the flip 4 comprises a pair of flip ears 8 and 10 connected to the flip 4. The flip ears 8 and 10 are mechanically coupled to the housing 2 to allow the flip 4 to rotate with respect to the housing 2. An axle mechanism 6 is contained partially in flip ear 10 and partially in the housing 2 to mechanically couple the flip 4 to the housing 2 in a manner that is well known in the art. A connector comprising a header 14 and a receptacle 16 is contained partially in flip ear 8 and partially in the housing 2 to mechanically and electrically couple the flip 4 to the housing 2. The flip 4 can be rotated around the axle mechanism 6 and the header 14 and receptacle 16, in conjunction functioning as an axle mechanism. The header 14 is rotatably connected to flip ear 8. The receptacle 16 is press fit into the housing 2 so that the receptacle 16 is unable to rotate with respect to the housing 2. The header 14 and the receptacle 16 are electrically and mechanically coupled so that, when coupled, the header 14 and receptacle 16 remain fixed with respect to each other and the housing 2. In an alternate embodiment, the axle mechanism 6 is contained partially in flip ear 8 and partially in the housing 2 and the header 14 is contained in flip ear 10. In another alternate embodiment, the header 14 is contained in the housing 2 and the receptacle 16 is contained in the flip ear 8, thereby reversing the header 14 and the receptacle 16 from the configuration in the preferred embodiment described above.

In a preferred embodiment, push-buttons 18 and an alpha-numeric display screen 20 are contained in the housing 2 and are externally visible. Electrical components, which in a preferred embodiment are contained on a printed circuit board ("PCB") 22, are contained within the housing 2. The PCB 22 has a PCB connector 24 electrically connected to flexible wires 26, or other conductive media, which are electrically connected to the receptacle 16. The flip 4 contains an antenna 28 and a microphone 30 that are electrically connected to the header 14 by flexible wires 32, or other conductive media. The flexible wires 26 in the housing 2, or the flexible wires 32 in the flip 4, or both, are able to flex as the flip rotates with respect to the housing to allow for smooth rotation and to prevent stress on the header 14 and/or the receptacle 16. The header 14 is electrically coupled to the receptacle 16, allowing electrical signals to travel from the antenna 28 and the microphone 30 to the PCB 22. Other electrical components may be placed in the flip 4 and connected to the PCB 22 in the housing 2 through the header 14, and the receptacle 16, as radio communication devices are further miniaturized.

Referring to FIGS. 2 and 3, the header 14 and receptacle 16 are shown in greater detail. In a preferred embodiment, the header 14 is a plastic component containing multiple header leads 34. The header 14 contains multiple female connectors 36 each electrically connected to one of the multiple header leads 34. The header leads 34 are connected to the flexible wires 32, or other conductive media, contained in the flip 4. The header 14 is surrounded by a bearing 38 that is able to freely rotate around the header 14. The bearing 38 is held in place around the header 14 by a bearing retainer 40. The bearing retainer 40 is fixed to the header 14 and permits only rotation about the axis of the header 14 by the bearing 38. Translation along the axis of the header 14 by the bearing 38 is prevented by the bearing retainer 40.

In a preferred embodiment, the receptacle 16 is a plastic component containing multiple receptacle leads 42. The receptacle 16 contains multiple male connectors 44 each electrically connected to one of the multiple receptacle leads 42. The receptacle leads 42 are connected to the flexible wires 26, or other conductive media, contained in the housing 2. The header 14 is electrically coupled to the receptacle 16 by being received into the receptacle 16. Each male connector 44 contained in the receptacle 16 is electrically coupled to one of the female connectors 36 when the header 14 is coupled to the receptacle 16. As a result, each of the header leads 34 is electronically coupled to a corresponding receptacle lead 42.

In a preferred embodiment, the header 14 contains a header/receptacle alignment protuberance 46 and the receptacle 16 contains a header/receptacle alignment groove 48. The header/receptacle alignment protuberance 46 must be aligned with the header/receptacle alignment groove 48 for the header 14 to be received by the receptacle 16, ensuring that each male connector 44 is coupled to the proper female connector 36. The receptacle 16 also has a receptacle/housing alignment protuberance 50 that ensures proper alignment of the receptacle 16 when the receptacle 16 is press fit into the housing 2.

Figure 4:
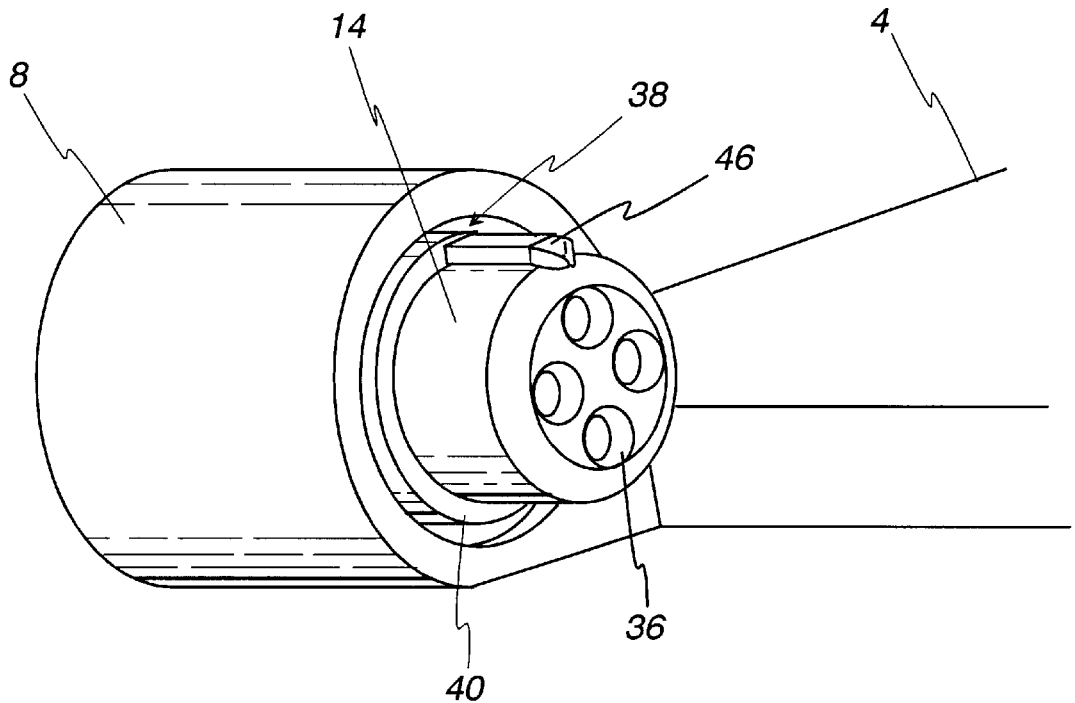
FIG. 4 is a perspective view of a preferred embodiment of a flip ear containing a header in accordance with the invention.

Referring to FIG. 4, in a preferred embodiment, the assembly of the header 14, bearing 38, and bearing retainer 40 is shown contained in flip ear 8. The bearing 38 is press-fit into flip ear 8, and circumscribes the header 14. The bearing retainer 40 is fixedly connected to the header 14 and holds the bearing 38 in place around the header 14. As assembled, the bearing 38 remains fixed with respect to the flip 4, but is able to rotate around the header 14. Therefore, the entire flip 4 is able to rotate around the header 14. In an alternate embodiment, the header 14, bearing 38, and bearing retainer 40 are assembled in flip ear 10. In another alternate embodiment, the bearing 38 and the bearing retainer 40 are eliminated, and the flip ear 10 rotates directly around the header 14, plastic-on-plastic, without a bearing between them.

Figure 5:
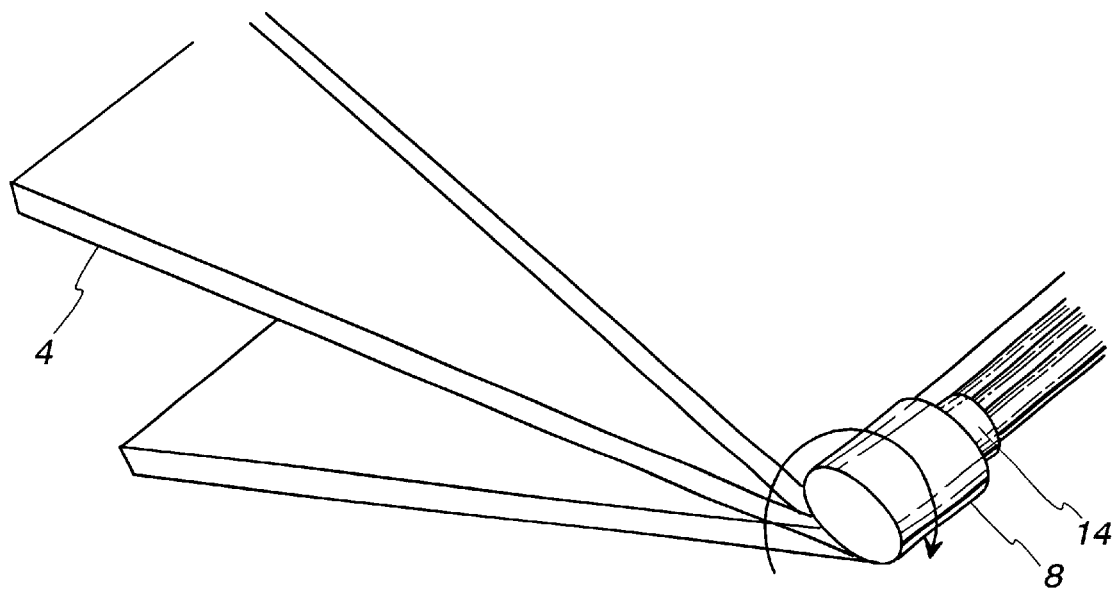
FIG. 5 is a perspective view of a preferred embodiment of a rotatable flip in accordance with the invention.

Referring to FIG. 5, the rotation of the flip 4 and the flip ear 8 around the stationary header 14 is illustrated.

Figure 6:
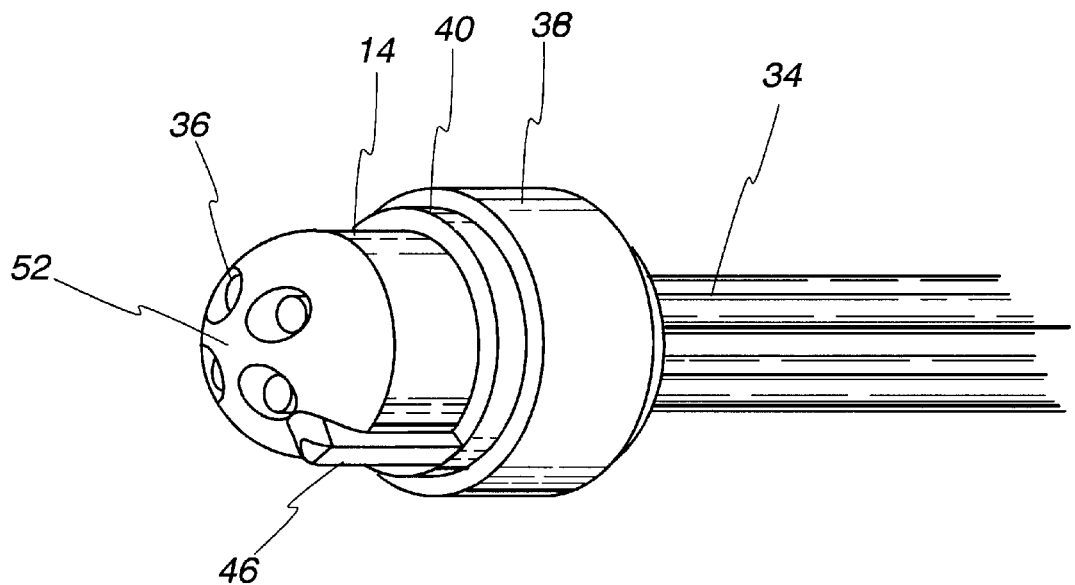
FIG. 6 is a perspective view of an alternate embodiment of a header having a semi-spherical end in accordance with the invention.
Figure 7:
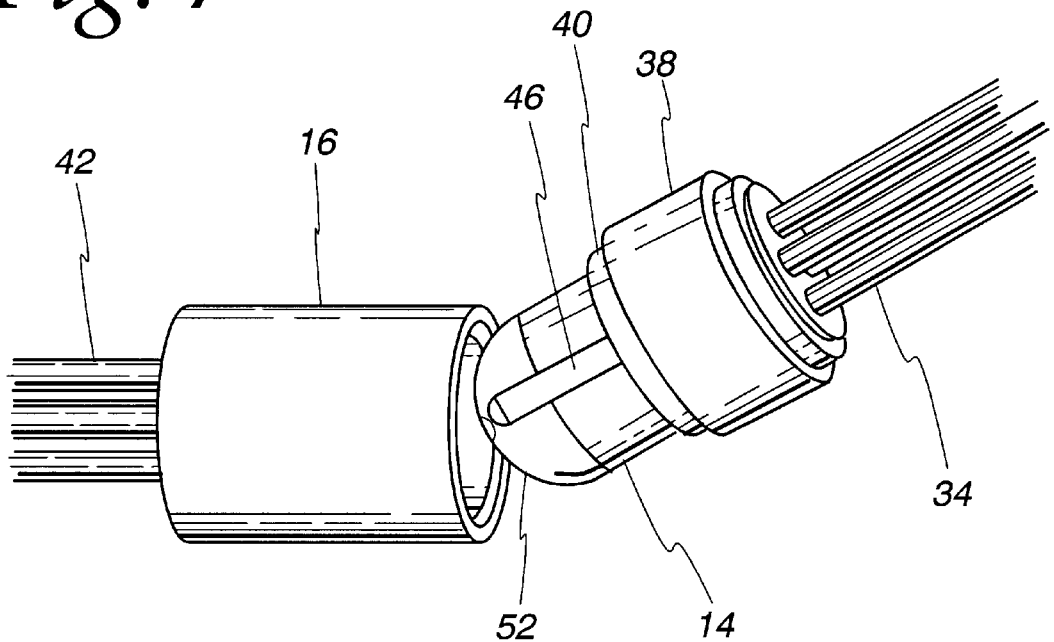
FIG. 7 is a perspective view of an alternate embodiment of a header having a semi-spherical end and a receptacle in accordance with the invention.

Referring to FIGS. 6 and 7, in an alternate embodiment, the header 14 has a semi-spherical end 52. The semi-spherical end 52 allows angular insertion of the header 14 into the receptacle 16 that is typical for flip installation.

Figure 8:
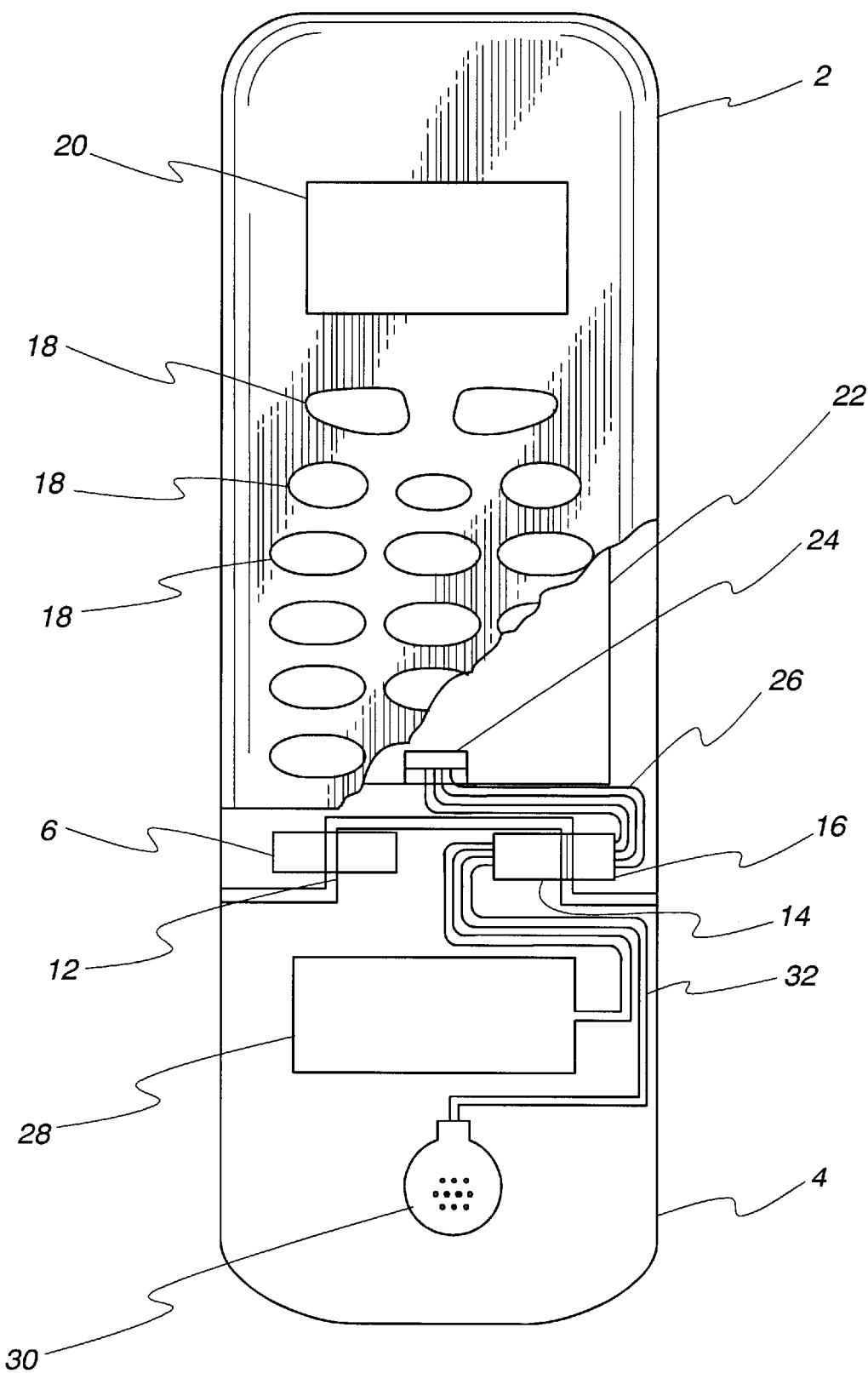
FIG. 8 is a front perspective view of an alternate embodiment of a radio communication device in accordance with the invention including a cut-away portion to show internal features.

Referring to FIG. 8, an alternate embodiment of the radio communication device is shown. The means to rotatably connect the housing 2 to the flip 4 comprises a single flip ear 12 connected to the flip 4. The flip ear 12 is mechanically coupled to the housing 2 to allow the flip 4 to rotate with respect to the housing 2. An axle mechanism 6 is contained in flip ear 12 and the housing 2 to mechanically and electrically couple the flip 4 to the housing 2 in a manner that is well known in the art. A connector comprising a header 14 and a receptacle 16 is also contained in flip ear 12 and the housing 2 to mechanically and electrically couple the flip 4 to the housing 2. The flip 4 can be rotated around the axle mechanism 6 and the header 14 and receptacle 16. The header 14 is rotatably connected to flip ear 12. The receptacle 16 is press fit into the housing 2 so that the receptacle 16 is unable to rotate with respect to the housing 2. The header 14 and the receptacle 16 are electrically and mechanically coupled so that, when coupled, the header 14 and receptacle 16 remain fixed with respect to each other and the housing 2.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A communication device comprising:
   housing:
   a first electrical apparatus fixedly disposed with respect to the housing;
   a housing connector connected to the first electrical apparatus;
   a flip;
   a second electrical apparatus fixedly disposed with respect to the flip;
   a flip connector fixedly connected with the housing connector and connected to the second electrical apparatus to thereby connect the first and second electrical apparatus; and
   means for pivotally connecting the flip and housing for relative movement around a first axis extending through the housing and flip connectors, whereby pivotal movement of the flip around the first axis does not cause pivoting movement of the housing connector with respect to the flip connector around the first axis.

2. A communication device as claimed in claim 1 wherein the housing and flip connectors are detachably coupled.

3. A communication device as claimed in claim 2 wherein the housing connector is fixedly connected with the housing and the flip connector is a header rotatably connected with the flip.

4. A communication device as claimed in claim 3 wherein the header is circumscribed by a bearing having a central axis, said bearing being fixedly connected with the flip so that the central axis of the bearing is substantially coincident with the first axis.

5. A communication device as claimed in claim 4 wherein the position of the bearing is maintained by a bearing retainer fixedly connected with the header.

6. A communication device as claimed in claim 3 wherein the header contains a header/receptacle alignment protuberance and the housing connector contains a header/receptacle alignment groove.

7. A communication device as claimed in claim 3 wherein the housing connector contains a receptacle/housing alignment protuberance.

8. A communication device as claimed in claim 2 wherein the housing connector is rotatably connected with the housing and the flip connector is fixedly connected with a flip ear.

9. A communication device as claimed in claim 1 wherein the electrical apparatus contained in the flip includes an antenna.

10. A communication device as claimed in claim 1 wherein the electrical apparatus contained in the flip includes a microphone.

11. A communication device as claimed in claim 1 wherein the electrical apparatus contained in the flip includes an antenna and a microphone.

12. A communication device as claimed in claim 2 wherein the flip connector includes a semi-spherical end to permit angular insertion of the flip connector into the housing connector.

13. A communication device comprising:
   a housing;
   a flip;
   a hinge means for pivotally connecting the housing with the flip for relative pivoting movement about a first axis; and
   a coupling pivotally contained within the hinge means, said coupling comprising:
      a header electrically connected with electrical apparatus of the flip; and
      a receptacle electrically connected with electrical apparatus of the housing and fixedly electrically and mechanically coupled with the header,
   wherein the first axis extends through the header and receptacle.

14. A communication device as claimed in claim 13 wherein the receptacle and the header are detachably coupled.

15. A communication device as claimed in claim 14 wherein the receptacle is fixedly connected with the hinge means and the header is rotatably connected with the hinge means.

16. A communication device as claimed in claim 15 wherein the header is circumscribed by a bearing, said bearing being fixedly connected with the hinge means.

17. A communication device as claimed in claim 16 wherein the position of the bearing is maintained by a bearing retainer fixedly connected with the header.

18. A communication device as claimed in claim 15 wherein the header contains a header/receptacle alignment protuberance and the receptacle contain a header/receptacle alignment groove.

19. A communication device as claimed in claim 15 wherein the receptacle contains a receptacle/housing alignment protuberance.

20. A communication device as claimed in claim 13 wherein the receptacle is rotatably connected with the hinge means and the header is fixedly connected with the hinge means.

21. A communication device as claimed in claim 13, wherein the electrical apparatus contained in the flip includes an antenna.

22. A communication device as claimed in claim 13 wherein the electrical apparatus contained in the flip includes a microphone.

23. A communication device as claimed in claim 13 wherein the electrical apparatus contained in the flip includes an antenna and a microphone.

24. A communication device as claimed in claim 14 wherein the header includes a semi-spherical end to permit angular insertion of the header into the receptacle.

25. An electronic device comprising:
   a housing;
   a receptacle;
   a flip having a first flip ear and a second flip ear, said first flip ear and second flip ear engageable with the housing for pivotally connecting the flip with the housing for relative movement around a first axis;
   a header connected with the first flip ear and fixedly mechanically and electrically coupled with the receptacle; and
   an axle connected with the second flip ear and the housing,
   wherein the first axis extends through the header.

26. A An electronic device as claimed in claim 25 wherein the receptacle and the header are detachably coupled.

27. An electronic device as claimed in claim 25 wherein the receptacle is fixedly connected with the housing and the header is rotatably connected with the first flip ear.

28. An electronic device as claimed in claim 27 wherein the header is circumscribed by a bearing, said bearing being fixedly disposed in the first flip ear for pivotal movement with re the housing.

29. An electronic device as claimed in claim 28 wherein the position of the bearing is maintained by a bearing retainer fixedly connected with the header.

30. An electronic device as claimed in claim 25 wherein the receptacle is pivotally connected with the first flip ear and the header is fixedly connected with the housing.

31. An electronic device as claimed in claim 25 further comprising:
   one or more electronic components contained in the housing and electrically connected to the receptacle; and
   one or more electronic components contained in the flip and electrically connected to the header.

32. A method for electrically connecting and pivoting a flip with respect to a housing of a communication device, said method comprising the steps of:
   fixedly electrically connecting a stationary flip connector with a stationary housing connector;
   electrically connecting electrical components of the flip with the flip connector;
   electrically connecting electrical components of the housing with the housing connector; and pivoting the flip with respect to the housing and stationary flip and housing connectors around an axis that extends through the flip and housing connectors.

33. The communication device as claimed in claim 1 wherein at least one of the flip and housing connector has a cylindrical shape with a central axis that coincides with the first axis.

34. The communication device as claimed in claim 13 wherein the flip is pivotable around the header.

35. The electronic device according to claim 25 wherein the flip is pivotable around the header.

36. A method for electrically and mechanically connecting a flip to a housing on an electronic device, said method comprising the steps of:

connecting a first electrical apparatus to the housing;

connecting the first electrical apparatus to a first connector;

positioning the first connector at least partially in an ear on the housing;

fixedly connecting the first connector to a second connector;

positioning the second connector at least partially in an ear on the flip so that the first and second connectors are connected to each other and the flip is pivotable around the second connector while the first and second connectors remain fixedly connected relative to each other;

connecting the second connector to a second electrical apparatus; and connecting the second electrical apparatus to the flip.

37. The method of claim 36 wherein the step of connecting the first electrical apparatus to the first connector further comprises connecting flexible wiring between the first electrical apparatus and the first connector.

38. The method of claim 36, wherein the step of connecting the second electrical apparatus to the second connector further comprises connecting flexible wiring between the second electrical apparatus and the second connector.

* * * * *